Feb. 12, 1946. F. E. HORNE, JR 2,394,612
BURRING TOOL
Filed April 13, 1943 3 Sheets-Sheet 1

FREDERICK E. HORNE, JR.,
INVENTOR.

BY
ATTORNEY.

Feb. 12, 1946.  F. E. HORNE, JR  2,394,612
BURRING TOOL
Filed April 13, 1943  3 Sheets-Sheet 2
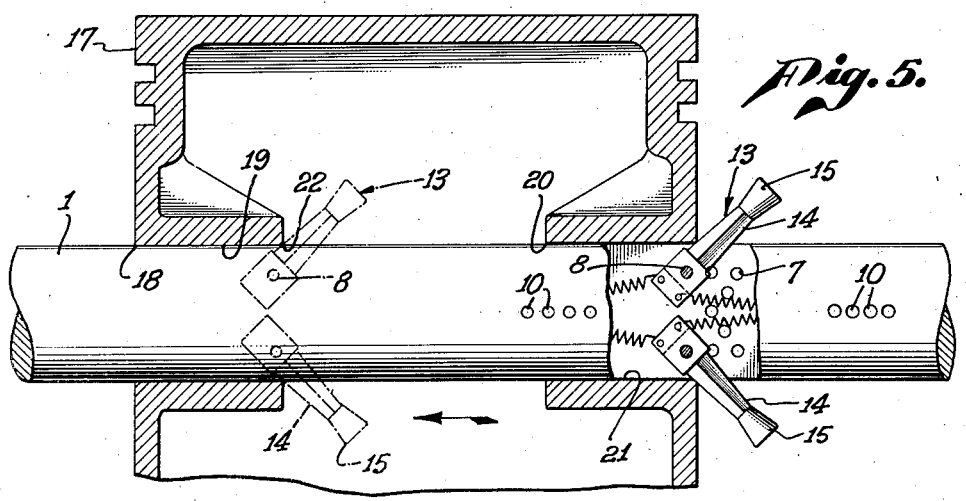
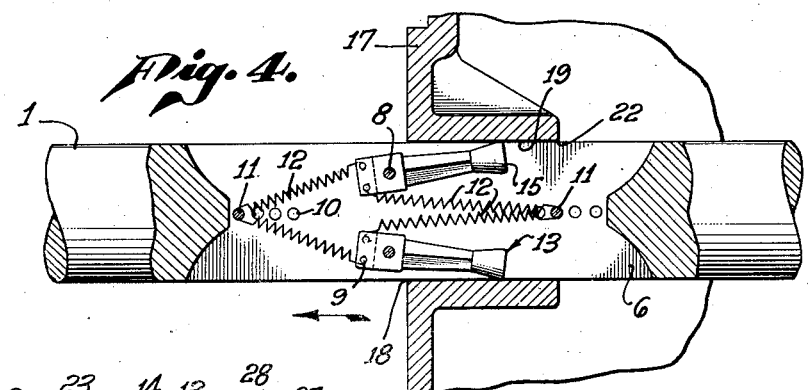
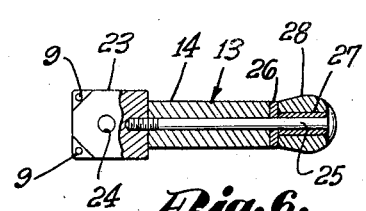
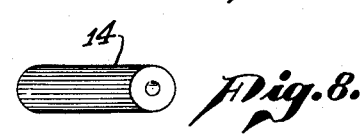
FREDERICK E. HORNE, JR.,
INVENTOR.
BY
ATTORNEY.

FREDERICK E. HORNE, JR.,
INVENTOR.

Patented Feb. 12, 1946

2,394,612

UNITED STATES PATENT OFFICE 2,394,612

BURRING TOOL

Frederick E. Horne, Jr., Glendale, Calif.

Application April 13, 1943, Serial No. 482,943

5 Claims. (Cl. 77—73.5)

This invention relates to a burring, chamfering, or cutting tool designed to remove burrs from the edge of a hole or chamfer the edge of holes, and particularly to a cutting or grinding tool formed to present the cutting element of the tool at an angle to the edge being burred or chamfered. It is common in machine shop practice, where a hole is drilled or otherwise formed through a surface, such as a plane or the surface of a cylinder, to clean the edge of the hole to remove the burrs left by the boring operation. Where the hole is formed in a curved surface, the edge is developed in the surface in such a manner that different points on the edge are at varying distances from a plane tangent to the surface where the hole is formed.

Another problem which is presented by such operation arises in machine elements where it is necessary to remove burrs from the edge of the hole which is in the interior of the part and cannot be reached by an ordinary burring tool which addresses the part from the exterior. I have developed a tool which is capable of automatically accommodating itself to the edge of the hole being burred and in which the conical, i. e., vertex, angle of the cutting or grinding surface, i. e., its slope, is automatically adjusted so that the edge of the hole being burred is followed irrespective of its shape. Thus, the cutting or grinding element, hereinafter generically designated as a cutting element, will follow the edge bored or formed in a plane surface or in a surface of revolution, such as a cylinder or sphere, or in any other surface, and will accommodate itself to the shape of the hole in the surface to reach all parts of the hole. The edge of the hole may therefore be processed from a single position of the tool or by moving the tool in a uniform, forward or backward direction parallel to the axis of the hole if the hole is round. By employing my tool, I may remove burrs from the hidden edges of the hole or passageway by passing the tool from the exterior of the part through the hole into the interior of the part, and my tool will accommodate itself to the hidden edge of the hole and will follow that hidden edge, irrespective of its shape, to remove burrs from all parts thereof conveniently and speedily.

This invention will be further described by reference to the drawings, in which

Fig. 4 shows the tool part way through the hole, and shows the cutting members disengaged from the surface of the bore;

Fig. 5 shows the tool in position to remove burrs from the opposed edge of the bores shown in Fig. 3;

Fig. 6 is a sectional view of a modified form of a cutting member;

Figure 3:
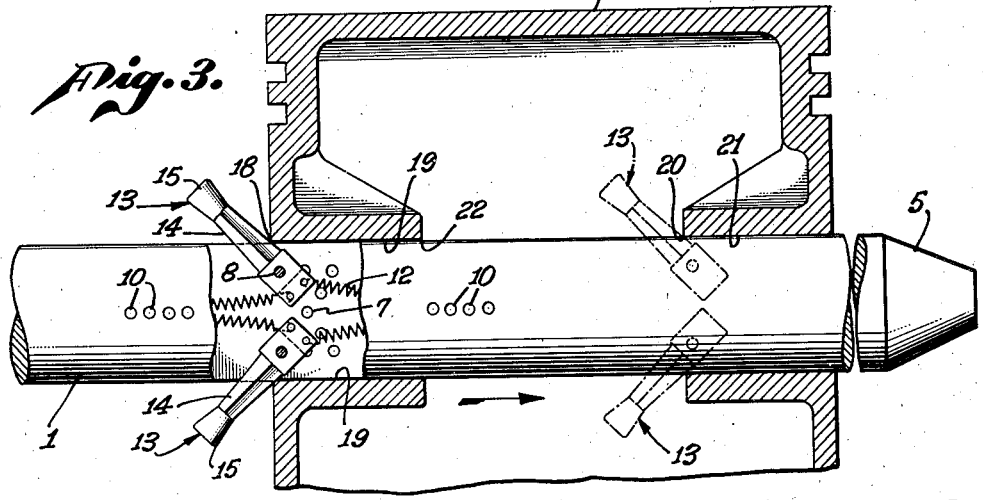
Fig. 3 is a view partly broken away, showing the tool in position to start the removal of burrs from an exterior edge and an interior edge of a bore, specifically shown as wrist pin bores of a piston.
Figure 11:
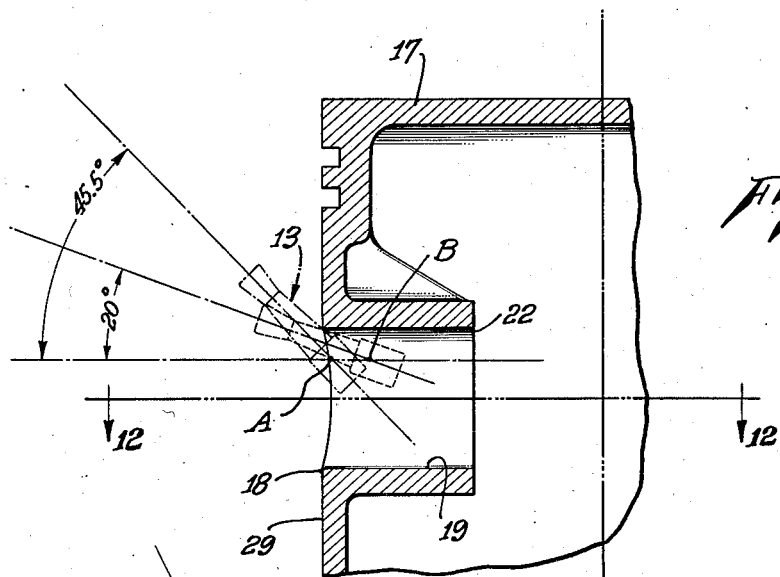
Figure 12:
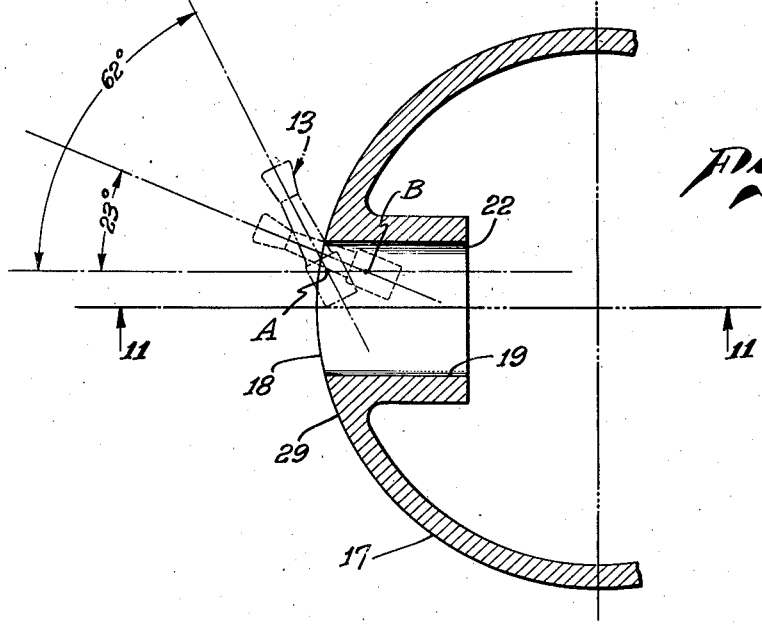

Figs. 7, 8, 9, and 10 show various cutting elements which may be employed with my tool;

Fig. 11 is a vertical section of the piston of Figs. 3 and 5; and shows the position of the cutting members at different stages of the burring operation during traverse of the tool through the bore; and Fig. 12 is a section taken along the line 12—12 of Fig. 11, and showing the position of the cutting members 90° from the position of the cutting member in Fig. 11.

Figure 1:
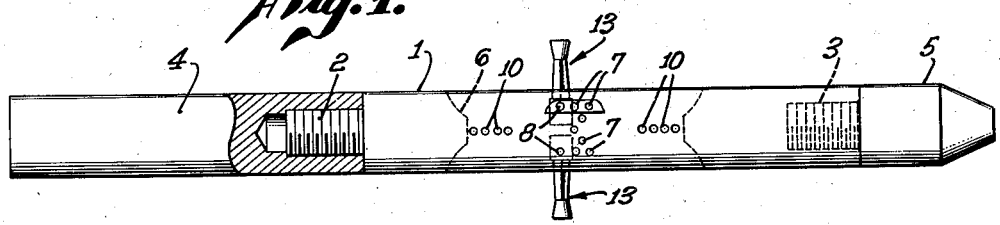
Fig. 1 is a plan view of the tool, showing one set of cutting members.

In these figures, 1 is a burring tool formed in sections assembled by means of screw threads 2 and 3. The numeral 4 may represent an additional tool section, such as 1, or merely a handle, and 5 is conveniently a non-metallic nose, such as a fiber nose, which will not mar the work if it should accidentally hit it. The tool may be combined with other tools such as reamers, boring bars, or drills. In Fig. 1, 6 is a recess, such as a slot, cut through the tool 1. Through it is drilled a plurality of holes 7 so that they pass through the tool and are in register on opposite sides of the slot 6. Pins 8 are passed through the holes 7. On pins 8 are rotatably mounted, cutting members 13. The holes 7 are so spaced as to permit a variation in the distance of the pins 8 from the axis of the tool to move the cutting members 13 away from or toward the center, as will be described below. The cutting members 13 are mounted to rotate freely about the pins 8. The shanks of the cutting members 13 are provided with holes 9 to which are connected tension springs 12 which are in turn connected to pins 11 positioned in holes 10 drilled through the sides of the tool 1. A plurality of holes are provided so that the tension of springs 12 may be adjusted by placing the pins 11 in the proper one of the plurality of holes 10.

As illustrated in Figs. 3 and 5, for convenience of description, two sets of cutting members are provided, each set containing two members, although it would be possible to employ but one member in the set or only one set. The cutting member carries the cutting element 14 which may take any desirable form, such as that illustrated in Figs. 1 and 2, or the forms described in Figs. 6 to 10. Mounted on the cutting member is a guard tip 15 made of smooth, soft metal, or fiber, or any other material which will not mar the work when it comes in contact therewith. The maximum diameter of this tip 15 may be greater than that portion of the cutting element which comes in contact with the work in order to effectuate the purposes hereinafter described.

Figure 2:
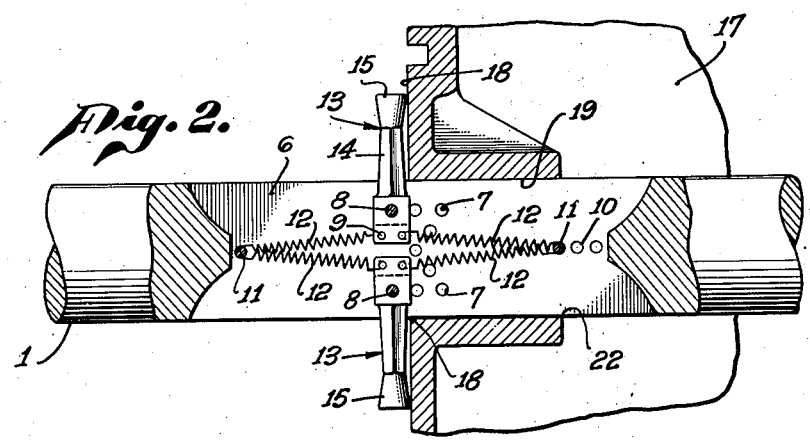
Fig. 2 is a view partly broken away, showing the tool in position just preceding the start of the operation for removal of burrs from the edge of the hole.

The operation of the tool will be understood from the foregoing description. The tool is entered through the hole, for instance, a wrist pin bore 19 in a piston 17. As the tool enters the hole, the cutting members under the influence of the tension springs 12 maintain an upright position. Fig. 2 shows the tool as it addresses the work. The tip 15, bearing against the surface around edge 18, maintains the sharp edges of the cutting element away from the work until, as the tool enters further into the work, as shown in Fig. 3, the cutting element makes contact with the edge 18. This prevents marring of the exterior surface of the piston wall. The tool may be revolved mechanically or manually, and as the tool rotates the cutting members bearing against the edge 18 of the hole, removes the burrs from the edge. While the tool is being rotated, it is moved forward and the cutting members are folded within the interior of the slot, the cutting element being folded back with a diminishing conical angle as the tool moves forward, at all times contacting the edge of the hole as it is being rotated to remove burrs from the hole until the edge rides over the smooth tip, whereupon the cutting elements, because the tips 15 bear against the wall of the hole, are retracted from the surface of the work, passing freely through the hole without contacting the internal bore, as shown in Fig. 4.

It will be noted in Figs. 4 that this position is shown with the tool moving to the left, whereas in Fig. 3 the tool is moved to the right, and the position of the cutting elements shown in Fig. 3 will, of course, be 180° in the other direction. The tool then progresses further until the tips clear the back end of the bore. Throughout all this part of the progress of the tool the tips have been in contact with the bore and have caused the retraction of the cutting elements so that they lie within the slot, the cutting edges being clear of the surfaces, thus preventing any marring of the bore surface. As the tool moves further in its progress, the tips 15 clear the further edge of the hole and the cutting elements spring upright to take the form shown in Fig. 2. The tool may then be pushed forward or backward to address an internal edge, such as edge 20 of bore 21 or edge 22 of bore 19, in Figs. 3 and 5.

The operation described with respect to edge 18 of bore 19 is repeated with respect to the edge 20 of bore 21 or 22 of bore 19. The removal of the burrs from the internal edge 22 of bore 19 may be accomplished by retracting the tool so that the cutting elements take the position shown in Fig. 5. As the tool is retracted to the left, as shown in Fig. 5, the cutting elements remove the burrs from the edge 22, and when retracted sufficiently they are folded within the tool, the tips 15 bearing against the surface of the bore to hold the cutting elements away from the bore surface until the tool is completely withdrawn in the direction shown in Fig. 5.

As will be observed, the tool may be made a compound tool by mounting two or more sets of cutting members, as shown in Figs. 3 and 5, so that a plurality of edges, externally and internally, may be cleared of burrs at the same time. This is particularly useful if the holes are of different diameters, in which case the tool may be made of sections of different size. Thus, in Fig. 3, the hole 21 and elements shown on the right-hand side may be smaller diameter. The tool is entered through the hole 19. The cutting elements are held firmly against the edge to be burred and follow that edge irrespective of its shape by means of the tension springs 12 which are so constructed as to tend to move the cutting elements to a vertical or generally upright position, as shown in Fig. 2. They are thus at all times pressed against the edges against which they bear and will thus follow those edges. This is aided by the centrifugal force of the rotating tool if the tool is rotated at sufficient speed so that this force becomes a material element.

This tool is particularly useful where the edge to be operated on is not a circle formed in a plane surface, but has some curved form with a varying surface, as, for instance, an elliptical hole or any other non-circular curve. Such holes are common where cylinders are bored, one of the most common being the wrist pin hole in a piston. When employing a tool for removal of burrs, having its cutting edges at a fixed angle to the axis of the tool, it is impossible to remove the burrs from all points of the edge. If the high points are reached by the tool, the low points are not contacted. If the low points are contacted and the burrs removed, the high points are countersunk. By employing my tool, the conical angle of the cone generated by the rotating cutting elements automatically changes to accommodate the varying radii of the bore edge and also to accommodate the varying conical angles formed as the rotating cutting elements are pushed through the hole whose edge is being burred. This permits the cutting or grinding operation whereby the edge is cleared of burrs without displacement of the axis of the tool which may be slid through the bore.

This will be best illustrated in Figs. 11 and 12. Fig. 11 is a horizontal section of a cylinder through which a hole has been bored, such as, for instance, a piston. Fig. 11 is a vertical section through line 11—11 of Fig. 12. Line 12—12 is the axis of the bore and the axis of the tool. Positions A and B show the respective positions of the center of rotation of the cutting members, for instance, the pins 8. 18 is the elliptical edge of the bore in the surface 29. It will be observed in Figs. 11 and 12 that as the tool moves to the right, the conical angle constantly diminishes. For purposes of illustration I have shown an angle of 20° in position A, and an angle of 45.5° in position B. This, of course, is not intended as a limitation on the design or operation of the tool. The angles will differ for different sized holes and tools. It will also be observed that the conical angle of the cutting members at any position, such as A or B, changes as it rotates through 90°, diminishing as it moves from the position in Fig. 12 to the position in Fig. 11. Again for purposes of illustration, the 90° position at position A is 23° and at position B is 62°. Of course, this same principle holds for other positions of my tool. The importance of this automatic adjustment of the conical angle of the cutting element is apparent from these diagrams.

I have as a result of my invention been able to develop a simple effective cutting tool which will accommodate itself to all the varying angles necessitated by the varying radii of the non-circular curve of the edge of a hole to be operated on and the varying conical angles required in the progress of the tool through the bore to permit the contacting of the cutting elements with the edge to be cleared of burrs during the operation. By providing means for adjusting the position of the point of rotation of the cutting members, such as pins 8, I am able to vary the distance between the cutting members, and thus make my tool capable of entering holes of varying diameters and shapes, provided always that the minimum diameter of the hole is not less than the diameter of the tool. Obviously, of course, when this occurs, it will be necessary to use a tool of smaller diameter. In fact, for tools of small diameter both cutting members 13 of any set may be mounted on one pin 8, so that their shanks overlap. I may, as previously described, mount a plurality of burring sections in series so as to simultaneously process more than one edge, for instance, as illustrated in Figs. 3 and 5.

The tension of the springs 12, or force exerted by the cutting elements against the edge to be smoothed of burrs, may also be adjusted by adjusting the position of the pins 11 in the various holes 10. The cutting element 14 may be either permanently fixed on the cutting members 13, as, for instance, by forming them as one piece, or the cutting elements may be assembled upon the cutting members as shown in Fig. 6.

In Fig. 6 the cutting member 13 is composed of a shank 23 carrying a hole 24 for pin 8, and carrying also the holes 9, as previously described. The cutting member 13, which may be any one of the shapes shown in Figs. 8-10, or any other convenient shape, is held in place by means of screw 25 and washer 26. Mounted on screw 25 is a tube 27, and upon tube 27 is mounted a tip 28 which is somewhat shorter than tube 27. When assembled the tube 27, bearing against the washer 26, holds the cutting element firmly in place so it will not rotate and the tip 28 is freely rotatable around the tube 27. The tip may be made of soft metal or fiber, or of any other material which will not mar the surface against which it bears, and the cutting element functions as previously described. This cutting element may be made of varying materials to adapt it to the particular metal being worked. For instance, it may be abrasive material here included within the generic description of a cutting element, such as shown in Fig. 7, or a round file, shown in Fig. 8, or may have a diamond cross-section with a cutting edge, as shown in Fig. 9, and may be hollow ground, if desired, or it may have a triangular cross-section shown in Fig. 10.

In employing the form shown in Fig. 10, it will be desirable to permit free rotation of the triangular cutting element around the bolt 25, the bolt, of course, being firmly in place to hold the cutting members together. The free rotation of the triangular cutting element will permit any flat side to follow the curve of the hole being burred. This feature is of particular utility on relatively soft metal, such as aluminum alloys. Elements such as shown in Figs. 7 and 8 may have their surfaces filled with the alloy cuttings so that their cutting edges and abrasive surfaces are masked. The element of Fig. 10, with its sides flat ground, its surfaces at an angle of 60° to each other, and with the edges not too sharp, is particularly useful in operating on aluminum alloys if the element is free to follow the edge to be burred.

It is to be understood that the foregoing description of embodiments of my invention is for purposes of illustration and modifications may be made therein without departing from the spirit of the appended claims.

I claim:

1. A cutting tool for operation on the edge of a bore, a tool section adapted to be passed through a bore, a cutting element rotatably mounted at one end of said element on said tool section, a guard tip at the other end of said element, means for normally holding said cutting element at an angle to said tool when said tool is not in use, and for holding said element in yieldable engagement with the edge of said bore whereby said element attains a variable angle to said tool section to press against and to engage the edge of the bore as said tool section passes through said bore, whereby the cutting element follows the edge of said bore when the tool section is rotated in said bore.

2. A cutting tool for operation on the edge of a bore, comprising a tool section, a recess in said section, a cutting element rotatably mounted at one end of said element in said recess, said recess extending on either side of the axis of rotation of said element for a distance to permit said element to be folded within said recess on either side of said axis of rotation, a guard tip at the other end of said element, and means adapted to hold said element yieldably in an upright position and to permit said element to rotate about said axis of rotation on both sides of said axis of rotation, whereby said cutting element may take a variable angular position to the axis of said tool section.

3. A cutting tool for operation on the edge of a bore, comprising a tool section, a recess in said section, a cutting element rotatably mounted at one end of said element in said recess on a pin, said recess extending on either side of the axis of rotation of said element for a distance to permit said element to be folded within said recess on either side of said pin, a guard tip at the other end of said element, and means adapted to hold said element yieldably in an upright position at substantially a right angle to the axis of said tool section and to permit said element to be folded into said recess at either side of a vertical to said tool axis and passing through said pin, whereby said cutting element may take a variable angular position to the axis of said tool section on either side of said vertical.

4. A cutting tool for operation on the edge of a bore, comprising a tool section, a recess in said section, a pin in said recess, a cutting element rotatably mounted on said pin, said pin being mounted in said recess beyond the end of said recess at a sufficient distance to permit said element to be folded within said recess on either side of said pin, and yieldable means adapted to hold said element yieldably in an upright position and to permit said element to rotate about the axis of said rotation on both sides of said axis, whereby said cutting element may take a variable angular position to the axis of said tool section.

5. A cutting tool for operation on the edge of a bore, comprising a tool section, a recess in said section, a cutting element rotatably mounted to rotate about an axis, said recess extending on both sides of said axis for a distance at least equal to the length of said element beyond the axis of rotation, and means adapted to hold said element yieldably in an upright position at substantially a right angle to the axis of said tool section and to permit said element to be folded into said recess at either side of said first mentioned axis, whereby said cutting element may take a variable angular position to the axis of said tool section on either side of said first mentioned axis.

FREDERICK E. HORNE, Jr.